US009500214B2

(12) United States Patent
Kleppen et al.

(10) Patent No.: US 9,500,214 B2
(45) Date of Patent: Nov. 22, 2016

(54) BOWTIE TANG RIVET

(71) Applicant: Snapz, LLC, Duvall, WA (US)

(72) Inventors: Robert Kleppen, Duvall, WA (US); Jason E. Schaefer, Duvall, WA (US)

(73) Assignee: Snapz, LLC, Duvall, WA (US)

( * ) Notice: Subject to any disclaimer, the term of this patent is extended or adjusted under 35 U.S.C. 154(b) by 36 days.

(21) Appl. No.: 14/558,039

(22) Filed: Dec. 2, 2014

(65) Prior Publication Data

US 2016/0153485 A1  Jun. 2, 2016

(51) Int. Cl.
    *F16B 21/00*    (2006.01)
    *F16B 19/10*    (2006.01)

(52) U.S. Cl.
    CPC ..................... *F16B 19/10* (2013.01)

(58) Field of Classification Search
    CPC ............ F16B 5/04; F16B 5/10; F16B 19/04; F16B 19/08; F16B 19/10; F16B 21/02; F16B 21/00
    USPC ............................................ D2/741; 411/549
    See application file for complete search history.

(56) References Cited

U.S. PATENT DOCUMENTS

| | | | | |
|---|---|---|---|---|
| 2,120,530 A * | 6/1938 | Shippee | ................. | B64D 29/06 411/349 |
| 2,228,760 A * | 1/1941 | Funk | .......... | F16B 5/10 411/549 |
| 2,324,268 A * | 7/1943 | Poupitch | .................. | B64C 1/06 411/549 |
| 2,325,295 A * | 7/1943 | Zaleske | ..................... | F16B 5/10 411/549 |
| 2,385,180 A * | 9/1945 | Allen | .................. | F16B 5/10 411/403 |
| 2,492,113 A * | 12/1949 | Rees | .......... | F16B 5/10 411/549 |
| 2,492,114 A * | 12/1949 | Crowther | .................. | F16B 5/10 411/549 |
| 2,571,641 A * | 10/1951 | Wing | .......... | F16B 5/10 248/73 |
| 2,684,515 A * | 7/1954 | Zahodiakin | ............... | F16B 5/10 411/353 |
| 2,757,429 A * | 8/1956 | Mills | .......... | F16B 5/10 411/259 |
| 3,060,538 A * | 10/1962 | Simi | .......... | F16B 5/10 411/155 |
| 3,407,454 A * | 10/1968 | Myatt | .................... | B64D 29/06 411/549 |
| 3,673,913 A * | 7/1972 | Barry | ..................... | F16B 21/04 411/34 |
| D249,396 S | 9/1978 | Kamata | | |
| 4,154,183 A * | 5/1979 | Nunez | ..................... | A63J 7/005 2/302 |
| 4,854,306 A | 8/1989 | Pujals, Jr. | | |
| D340,545 S | 10/1993 | Kamata | | |
| D355,731 S | 2/1995 | Gingras | | |
| 6,041,436 A * | 3/2000 | Keen | .......... | A41D 1/00 2/456 |
| D485,948 S | 1/2004 | Yi | | |
| D567,451 S | 4/2008 | Dion | | |
| D571,507 S | 6/2008 | Murakami | | |
| 8,376,287 B2 * | 2/2013 | Zhang | .................. | B21C 47/143 248/56 |
| D684,320 S | 6/2013 | Mateu Codina | | |
| 8,465,221 B2 * | 6/2013 | Yan | ...................... | H05K 7/1489 248/220.22 |
| D690,882 S | 10/2013 | Nowikow et al. | | |
| D701,002 S | 3/2014 | Lebel et al. | | |
| D701,649 S | 3/2014 | Church et al. | | |
| D703,387 S | 4/2014 | Janisse et al. | | |
| D709,653 S | 7/2014 | Lebel et al. | | |
| D725,313 S | 3/2015 | Beauchamp et al. | | |
| D743,631 S | 11/2015 | Tomas Gonzalez | | |
| D744,169 S | 11/2015 | Langan | | |
| D745,744 S | 12/2015 | Saam | | |
| 2010/0272540 A1 * | 10/2010 | Bucker | ................. | F16B 21/086 411/549 |

OTHER PUBLICATIONS

Micro Plastics, Inc. Catalog, Nylon Mini Rivets—item detail, available at: https://secure.microplastics.com/catalogfull.aspx, downloaded Jan. 11, 2016, 2 pages.
Micro Plastics, Inc. Catalog, Adjustable Male Rivet—item detail, available at: https://secure.microplastics.com/catalogfull.aspx, downloaded Jan. 11, 2016, 1 page.
Micro Plastics, Inc. Catalog, Post and Pin—item detail, available at: https://secure.microplastics.com/catalogfull.aspx, downloaded Jan. 11, 2016, 2 pages.
Micro Plastics, Inc. Catalog, Post and Screw—item detail, available at: https://secure.microplastics.com/catalogfull.aspx, downloaded Jan. 11, 2016, 2 pages.
Micro Plastics, Inc. Catalog, Ratcheting Action Rivets—item detail, available at: https://secure.microplastics.com/catalogfull.aspx, downloaded Jan. 11, 2016, 2 pages.
Ant-Man Movie: First Look at Ant-Man Helmet, posted at comicbook.com, posting on Jul. 26, 2014, available at http://comicbook.com/blog/2014/07/26/ant-man-movie-first-look-at-ant-man-helmet.
Rubies Deluxe Phase, posted at forum.rebelscum.com, posting on May 13, 2012, available at http://forum.rebelscum.com/t1081629/.
Optimus Prime Costume, posted at instructables.com, posting on Oct. 21, 2008, available at http://www.instructables.com/id/Building-Optimus-Prime/.

* cited by examiner

*Primary Examiner* — Roberta Delisle
(74) *Attorney, Agent, or Firm* — Ellen M. Bierman; Lowe Graham Jones PLLC

(57) ABSTRACT

A rivet device for securing compressible media is provided herein. The device comprises a rivet with head and shaft portions and a receiving unit. The rivet and the receiving unit are adapted for cooperative reversible rotational engagement. The rivet shaft is inserted into and passes through an aperture in one or more media and engages with the receiving unit on a surface of the media opposite the rivet head portion. Relative rotation in either direction between the rivet and the receiving unit directs reversible engagement of the rivet device. When the rivet device is engaged, the rivet head portion and the receiving unit cooperatively resist tension from the secured media. The rivet shaft is constructed to prevent buckling under pressure or bending under shear from the secured media. A costume assembly kit employing the rivet device to fasten substantially planar costume panels to produce a three-dimensional costume is also provided.

15 Claims, 8 Drawing Sheets

BOWTIE TANG RIVET

TECHNICAL FIELD

The present disclosure relates to rivets for securing compressible media. More specifically, the invention relates to a rivet device for securing wearable panels.

BACKGROUND

Rivets are used to fasten and secure media in a variety of contexts. For example, the use of permanently deformable steel rivets in the construction of buildings and other infrastructure is well known. The rivet features a head on one end of a shaft and a so-called "bucktail" on the distal end. In a basic application, a traditional rivet was hammered in a punched or drilled hole in a medium. The bucktail end was then upset (i.e., deformed), so that it expanded beyond the original shaft diameter to hold the rivet in place. The permanent expansion of the bucktail end allowed the rivet to support tension loads (loads parallel to the axis of the shaft), as well as shear loads (loads perpendicular to the axis of the shaft) without need for replacement. However, such rivets provide imperfect solutions where a removable, reusable fastener is required.

For example, many holiday and special event decorations requiring a fastener, such as honeycomb paper constructions, are only occasionally assembled and are otherwise disassembled or compressed for efficient storage to be re-used at a later date. Permanent fasteners such as traditional rivet designs do not permit reversible media fastening and cannot be re-used due to deformation. Alternative fasteners such as paperclips, brass fasteners and the like may be used in such instances, however, they suffer from high failure rates and other issues.

Rivets manufactured from deformable plastics are also known, but are not designed for repeated re-use. A truly reusable rivet could have utility in a variety of environments, beyond those contemplated in the prior art.

DETAILED DESCRIPTION

Figure 1:
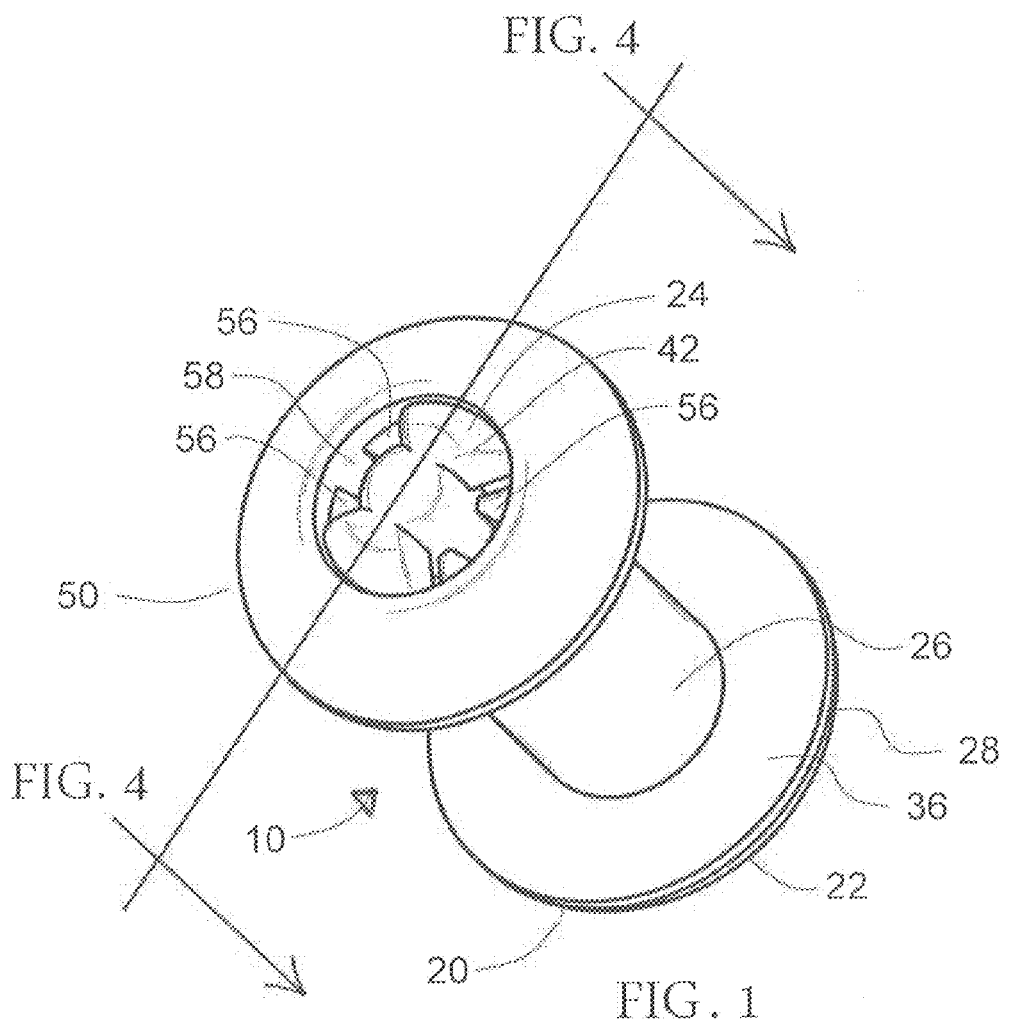
FIG. 1 is an isometric view of an example embodiment of a removable rivet device in accordance with the invention depicted in the assembled but unlocked state.

Inexpensive, reusable fastening devices that are easily manipulated, are not permanently deformed in use, and which yet enjoy the strength and reliability of a traditional rivet have a wide variety of uses, including for example, to assemble wearable panels such as in a garment to be worn as a costume. A bowtie tang rivet device in accordance with these principles is generally indicated at reference numeral 10 in the various figures of the attached drawings wherein numbered elements in the figures correspond to like numbered elements herein.

Figure 2:
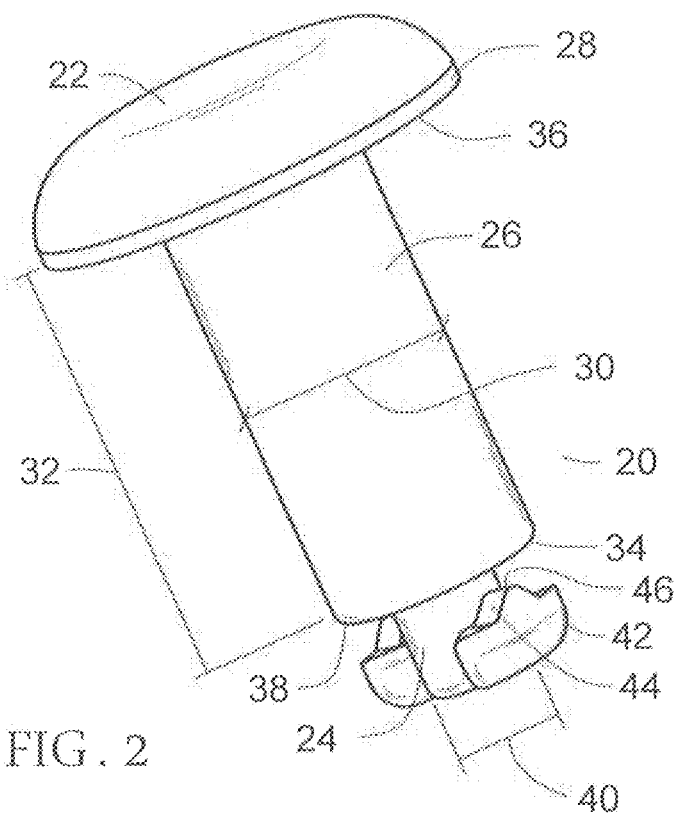
FIG. 2 is an isometric view of the rivet portion of an example embodiment of the rivet device.
Figure 4:
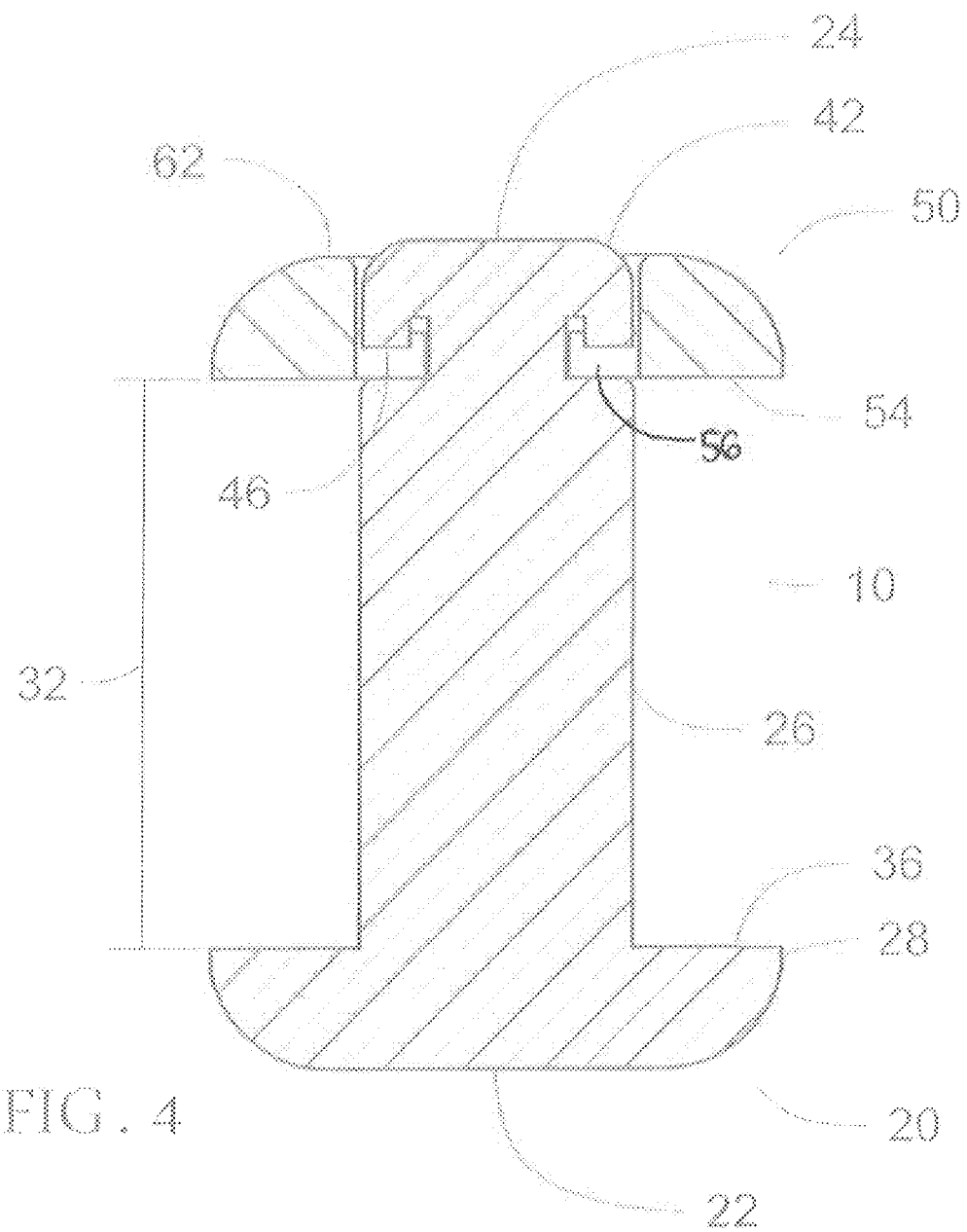
FIG. 4 is a sectional view taken along line 4-4 of FIG. 1 of an example embodiment depicted in the assembled and locked state.
Figure 5:
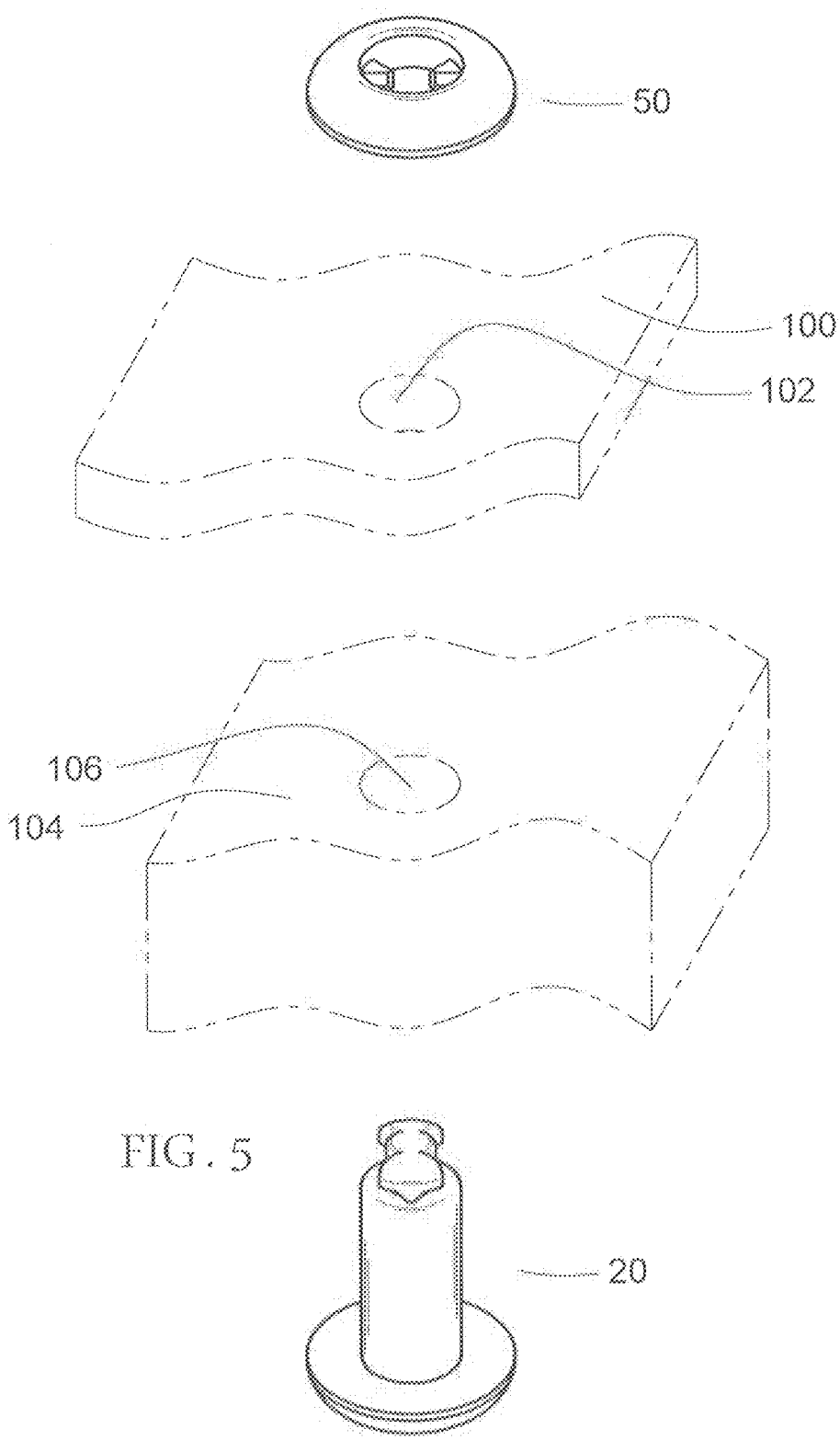
FIG. 5 is an isometric, environmental view of an example embodiment depicted in an uninstalled, unassembled and unlocked state.
Figure 6:
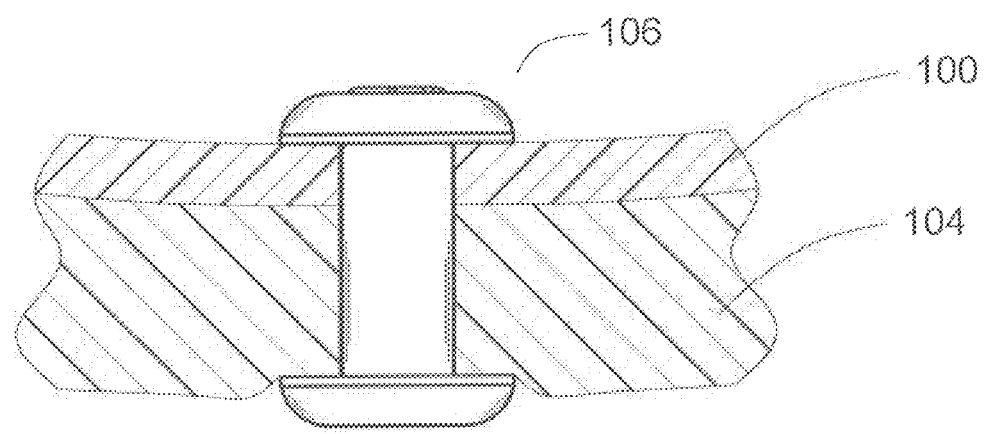
FIG. 6 is a side elevational environmental view of an example embodiment depicted in an installed, assembled and locked state.

As seen in FIGS. 1 and 4, the rivet device 10 includes a rivet 20 having a non-permanently-deforming bucktail or shank 26 connected to a head 22. The shank 26 terminates in a bow-tie tip 24. The head 22 is sufficient in diameter to allow manual installation through media with little force by pushing on the head to drive the bowtie tip 24 and shank 26 through installation media 100 and 104, such as compressible layers of a garment as shown in FIGS. 5 and 6. The head has a diameter 28 sufficient to anchor the shank 26 against the compressible installation media 100 and 104, permitting tension loading at the bowtie tip 24 while not inducing tearout failure of the installation media 100 and 104. As will be described in greater detail below, the bowtie tip 24 is adapted for releasable engagement with a receiving unit or twist-to-lock washer 50. As seen in FIGS. 2 and 4, the rivet shank 26 is typically cylindrical in longitudinal cross-section and is typically absent rings or notches. The shank 26 is of sufficient diameter 30 to prevent buckling under compression and bending under shear. The shank has a height 32 set appropriately with a shoulder 34 between the shank 26 and bowtie tip 24 such that the media 100 and 104 will compress when the rivet is engaged with the washer 50. The span between a rivet head flat 36 and shoulder 34 constitutes the rivet's intended installation thickness. When the rivet device 10 is in a locked position, as will be described further below, relaxation of the secured compressible installation media 100 and/or 104 urges the washer 50 axially away from the shank shoulder 38, thus further locking the rivet device 10. The shoulder 34 contains a radius 38 to prevent snagging during installation. The shank 26 has a reduced diameter 40 at the shoulder 34 sufficient to permit tension loading where compression and shear are not present. Further along the shank 26, opposite the head portion 22 and consistent with the radius 38 of the shoulder 34, the bowtie tip 24 is rounded over on its distal end and has radii 42 on all leading edges to permit snag-free passage through installation media 100 and 104. The bowtie tip 24 and shank 26 are plunged through two or more planar items 100 and 104 by pressing on the rivet head 22. The shank surface 30 is smooth to facilitate smooth travel through the installation mediums 100 and 104 with little force on the rivet head 22. The shank 26 will not buckle from the compression of column loading and the shank 26 will not bend from the shear caused by planar slip of the installation mediums 100 and 104. Unlike the shank 26, the bowtie tip 24 deviates at the shoulder 34 from a cylindrical shape to a bowtie shape. The bowtie shape is incorporated in the bowtie tip 24 and cooperatively matched in the twist-to-lock washer 50 as will be described further below. In example embodiments, the rivet device 10 is manufactured from nylon or another suitable polymer material in a conventional fashion.

Figure 3:
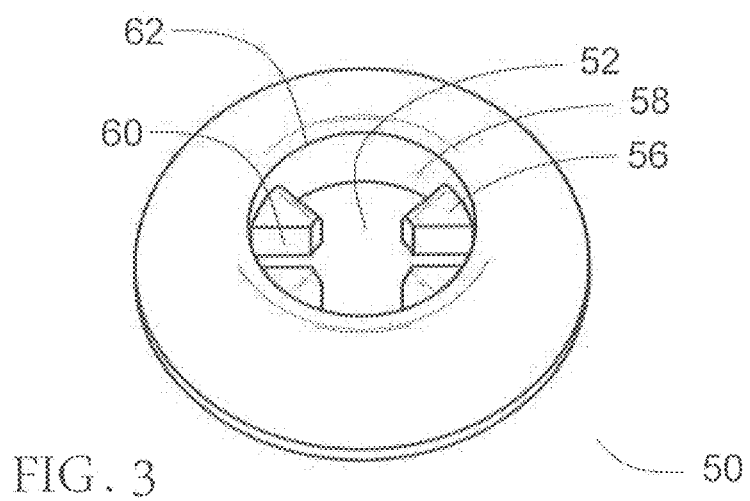
FIG. 3 is an isometric view of a washer portion of an example embodiment.

As illustrated in FIGS. 3 and 4, the washer 50 has four inwardly radially directed obstructions 56 located in the inner diameter of the washer 50 which project from the inner diameter 58, forming the bowtie shape of a bow-tie-shaped hole 52 on a bottom 54 of the washer 50. Adjacent obstructions 56 form a pair which define a relief or detent 60. That is, a relief 60 is defined by each pair of obstructions 56 and is sized sufficiently to receive rivet tangs 44 located on the bow-tie tip 42 of the shank 26. The bowtie tip 24 is aligned with the complementary bowtie hole 52 in the washer bottom 54, and the washer 50 is pressed on to the tip 24. The washer 50 is then turned 90 degrees to lock the washer with respect to the rivet. Twisting the washer 50 requires little force, and the moment induced on the bowtie tip 24 and shank 26 by the locking action is carried by the shank 26, head flat 36, and friction on the installation mediums 100 and 104. The installed and locked fastener 106 is in equilibrium from rivet head 22 to lock washer 50. Tension on the lock washer 50 is resisted by the rivet head 22. Tension on the rivet head 22 is resisted by the locked washer 50. Planar slip of the installation mediums 100 and 104 imparts a shear load on the shank 26 which the shank is sufficient to resist. Compression of the installation mediums 100 and 104 is largely present during installation of the rivet device 10 and thereafter.

The locking function of the fastener is generated by two components; one contained in the rivet 20 and one contained in the washer 50. The rivet tip 24 contains two diametrically opposed symmetric interference tangs 44 that are housed on a back side of the bowtie tip 24 between the shank shoulder 34 and bowtie tip 24. The tangs 44 are protected from contact with the installation media 100 and 104 by the bowtie tip 24 and possess radii and chamfers sufficient to prevent snagging with installation media 100 and 104 during removal of the rivet 20. The tangs 44 temporarily axially deflect when the washer 50 is moved to the locked or unlocked position, returning thereafter to a rest position. The tangs are sufficient in size and span to cause interference with the washer 50 and require an adequate amount of torque allowing for hand installation while resisting vibration or loosening action. By way of example, a rivet device 10 having a shank diameter of 0.180" and an overall height of 0.545" may have a tang height of 0.020".

As stated above, the washer 50 provides a pair of detents with the rivet tangs 44 by way of two pair of obstructions 56 located on the inner diameter 58 of the washer 50. The bottom 54 of the washer 50 is placed over the bowtie tip 24 of the rivet 20. The washer head 62 is recessed at a depth and diameter sufficient to permit counter rotation between the washer 50 and the bowtie tip 24. Relative bidirectional rotation of the rivet 20 with respect to the washer 50 or of the washer 50 with respect to the rivet 20 engages the rivet tangs 44 with the washer obstructions 56. The tangs 44 are tapered sufficiently to permit a ramping effect, and interference between the two parts causes axial elastic deformation of the rivet tangs 44 and bowtie tip 24. The tang tips 46 contain radii to permit a smooth ramping transition from the relaxed state to the deformed state. Deformation of the washer obstructions 56 is prohibited by the shoulder 34 on the rivet shank 26. A sufficient amount of torque is required to drive the rivet tang tips 46 past the obstructions 56 until the tangs 44 reach proximity to the obstruction reliefs 60. Upon coincidence of the tangs 44 and reliefs 60, the tangs 44 and bowtie tip 24 relax elastically, and the rivet device 10 is locked. As seen in FIG. 4, a gap (un-numbered) exists between an axial surface of the tangs 44 and obstructions 56. This gap is narrowed or eliminated by relaxation of the elastic installation media 100 and 104, which urges the washer 50 away from the shoulder 38 so that the top surfaces of obstructions 56 are in contact with the tip bottom 24. Expansion of the installation media 100 and 104 thus provides additional locking between the rivet 20 and the washer 50 and creates additional engagement depth between the tangs and reliefs.

Installation and locking of this rivet device 10 causes little wear to the interference components 44 and 56. The washer 50 can be repeatedly removed from the bowtie tip 24 with the same procedure for installation. Due to the symmetric design of the bowtie tip 24, rotation between the rivet 20 and washer 50 can be bi-directional. Installation and removal can be repeatedly achieved with a 90 degree turn in either the clockwise or counterclockwise direction. Upon removal of the washer 50, the rivet 20 can be removed from the installation mediums 100 and 104 by pulling on the rivet head 22 at the rivet head diameter 28. The design of the rivet shank 26, shoulder 34, bowtie tip 24 and tangs 44 are such that the rivet 20 will remove with ease, free from snagging or catching the installation mediums 100 and 104. The removed rivet device 10 does not suffer permanent deformation or yield and is suitable for reuse multiple times.

Figure 7:
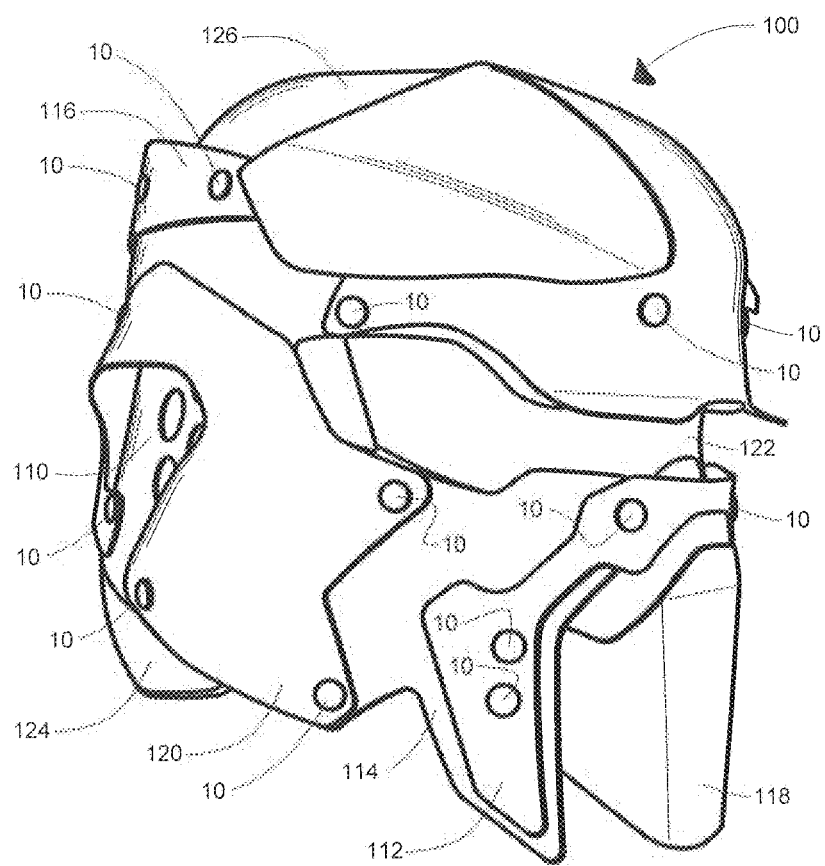
FIG. 7 shows an assembled state left-side perspective view of a role playing costume kit utilizing the rivet device of example embodiments.
Figure 8:
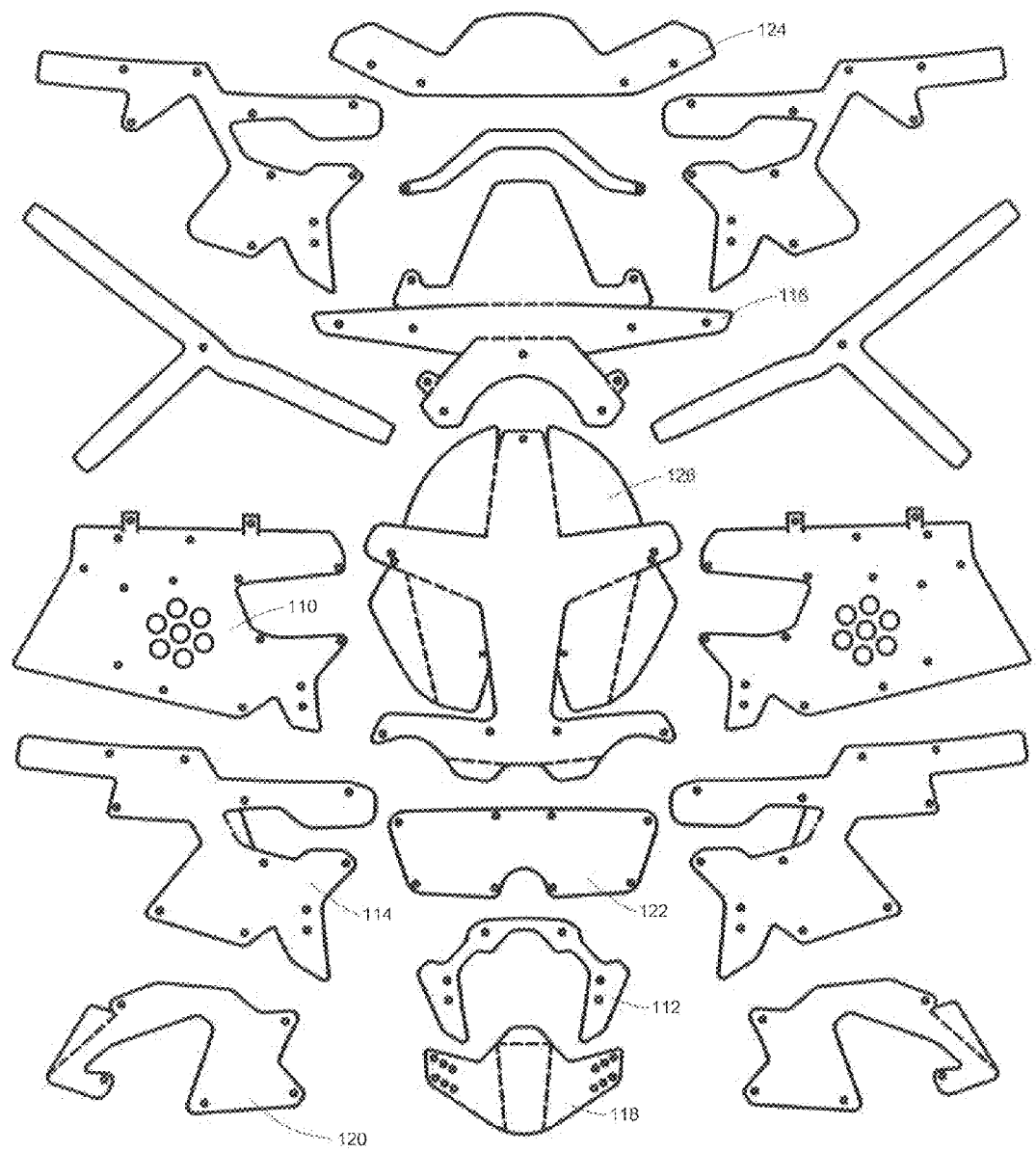
FIG. 8 shows a top view of unassembled planar state components of the costume kit of FIG. 7.

The rivet device 10 and washer 50 have utility in a variety of settings. In fashion and costume design, for example, creatively-designed garments require reliable, reusable and reversible fastening means. In recent times, intricate costumes designs inspired by film, animation and computer games have grown in popularity. The ideal costume is true to the underlying concept, aesthetically pleasing, and comfortable for the wearer. Such costume designs require more sophisticated construction and functionality than can be offered by traditional rivets, and yet may require the strength and stability of a rivet over other fasteners. Traditional fasteners may cause discomfort to the wearer and inhibit mobility, thereby negating any advantages gained by the fastening. One example is shown in FIG. 8 where a child's costume component (e.g., a helmet) 100 comprises various panels 110-122 of planar foam or other suitable elastically deformable material having a design thereon. Assembly of the panels is accomplished with a plurality of the rivet devices 10 and washer 50 (hidden from view) of those described here, and permits the costume to assume a three-dimensional shape as shown in FIG. 7. Other types of garments including those to be worn for purposes other than costumes are also contemplated.

From the foregoing it will be appreciated that, although specific examples have been described herein for purposes of illustration, various modifications may be made without deviating from the spirit and scope of the invention. For example, the rivet shank 26 may be square in cross-section rather than cylindrical to prevent counter-rotation of the secured media 100 and 104. Thus, the invention is not to be limited to the above description, but is to be determined in scope by the claims which follow.

The invention claimed is:

1. A reversibly engageable, non-permanently deformable rivet device for securing compressible media, comprising:
   a rivet; and
   a receiving unit having means for reversible cooperative engagement with the rivet by rotation, wherein the receiving unit and the rivet cooperatively resist expansion from the secured medium when engaged, wherein the rivet has a head portion and a substantially smooth shank portion attached to the head portion, the shank portion extending longitudinally therefrom to terminate at a shank tip, wherein the shank portion has a shoulder distal to the head, the shank portion narrowing at the shoulder to form the shank tip, wherein the shank tip includes a complementary engaging means for reversible cooperative engagement with the receiving unit and wherein the shank tip further is bow-tie shaped,
   wherein the bow-tie shaped tip has a substantially circular central element and a plurality of radially-extending flanges having increased lateral dimensions with increasing radial distance from the shank portion.

2. The rivet device of claim 1, wherein the complementary engaging means are a plurality of interference tangs.

3. The rivet device of claim 2, wherein the tangs extend longitudinally on the flanges between the tip and the shoulder.

4. The rivet device of claim 1, wherein the flanges are chamfered for smooth passage through an aperture in the media.

5. The rivet device of claim 4, wherein the shank is polygonal in cross-section and is configured to prevent relative rotation of the compressible media.

6. The rivet device of claim 4, wherein the shank is substantially cylindrical configured to permit relative rotation of the compressible media.

7. A reversibly engageable, non-permanently deformable, reusable rivet device for securing compressible media, comprising:
  a rivet having a head portion and a shank portion attached to and extending longitudinally from the head portion and narrowing at a shoulder distal to the head to terminate at a shank tip, the shank tip defining a longitudinally-directed bow-tie shape having a substantially circular central element and a plurality of radially-extending flanges having increased lateral dimensions with increasing radial distance from the shank portion, the radially-extending flanges being adapted to form a plurality of interference tangs extending longitudinally towards the shoulder; and,
  a receiving unit, having a plurality of obstructions positioned to rotationally complement the interference tangs, wherein the receiving unit and the rivet cooperatively resist expansion from the secured medium when engaged.

8. The rivet device of claim 7, wherein the shank is polygonal in cross-section.

9. The rivet device of claim 7, wherein the shank is cylindrical.

10. The rivet device of claim 7, wherein the shank is substantially smooth.

11. The rivet device of claim 7, wherein the flanges are chamfered for smooth passage through an aperture in a medium.

12. The rivet device of claim 7, wherein the plurality of obstructions are positioned to rotationally complement the interference tangs along a recessed interior diameter of the receiving unit.

13. A costume assembly kit, comprising:
  a plurality of substantially planar costume panels each having at least one compressible medium; and
  a plurality of bow-tie tang rivet devices for securing corresponding costume panels to one another to form a three-dimensional costume,
  wherein each rivet device has a rivet, including a head portion and a shank portion attached to the head portion and extending longitudinally therefrom and deforming at a shoulder distal to the head portion to form a longitudinally-facing bow-tie shaped tip, wherein the bow-tie shaped tip has a substantially circular central element and a number of flanges extending radially therefrom having increased lateral dimensions with increasing radial distance from the shank portion, wherein the flanges deform longitudinally toward the shoulder to form a plurality of interference tangs, and a receiving unit, having a plurality of obstructions positioned along a recessed interior diameter of the receiving unit to rotationally complement the interference tangs, the rivet and the receiving unit being adapted to reversibly secure therebetween the at least one costume panel compressible media, and wherein the rivet head and the receiving unit cooperatively resist separation from the secured at least one costume panel compressible media when engaged.

14. The costume assembly kit of claim 13, wherein the rivet shank portion is substantially cylindrical configured to permit relative rotation of the compressible media.

15. The costume assembly kit of claim 13, wherein the rivet shank portion is polygonal in cross-section configured to prevent relative rotation of the compressible media.

* * * * *

UNITED STATES PATENT AND TRADEMARK OFFICE
CERTIFICATE OF CORRECTION

PATENT NO. : 9,500,214 B2
APPLICATION NO. : 14/558039
DATED : November 22, 2016
INVENTOR(S) : Robert Kleppen et al.

Page 1 of 1

It is certified that error appears in the above-identified patent and that said Letters Patent is hereby corrected as shown below:

In the Claims

In Column 5, Line 30, Claim 7, the "," should be removed.

In Column 6, Line 9, Claim 13, a --,-- should be inserted after "panels".

Signed and Sealed this
Tenth Day of January, 2017

Michelle K. Lee
*Director of the United States Patent and Trademark Office*